US006985570B2

(12) United States Patent
Hasemann

(10) Patent No.: US 6,985,570 B2
(45) Date of Patent: Jan. 10, 2006

(54) METHOD FOR THE ESTABLISHMENT OF A TELECOMMUNICATION LINK

(75) Inventor: Joerg-Michael Hasemann, Thedinghausen (DE)

(73) Assignee: Robert Bosch GmbH, Stuttgart (DE)

( * ) Notice: Subject to any disclaimer, the term of this patent is extended or adjusted under 35 U.S.C. 154(b) by 304 days.

(21) Appl. No.: 10/169,685

(22) PCT Filed: Dec. 22, 2000

(86) PCT No.: PCT/DE00/04612

§ 371 (c)(1),
(2), (4) Date: Sep. 23, 2002

(87) PCT Pub. No.: WO01/52559

PCT Pub. Date: Jul. 19, 2001

(65) Prior Publication Data
US 2003/0103613 A1 Jun. 5, 2003

(30) Foreign Application Priority Data
Jan. 8, 2000 (DE) .............................. 100 00 498

(51) Int. Cl.
H04M 1/00 (2006.01)
H04M 3/42 (2006.01)
H04M 3/487 (2006.01)
H04M 7/00 (2006.01)

(52) U.S. Cl. ................ 379/201.01; 379/87; 379/88.22; 379/230; 379/257

(58) Field of Classification Search ............... 379/67.1, 379/88.22, 88.25, 201.01, 373.01, 373.03, 379/374.02, 87, 207.02, 230, 251, 257
See application file for complete search history.

(56) References Cited

U.S. PATENT DOCUMENTS
4,811,382 A * 3/1989 Sleevi ...................... 379/67.1
RE34,380 E 9/1993 Sleevi ..................... 379/88.25

FOREIGN PATENT DOCUMENTS
DE         245 733 C      8/1911
DE         198 33 206 A   1/2000
EP         0 920 165 A    6/1999

* cited by examiner

Primary Examiner—Harry S. Hong
(74) Attorney, Agent, or Firm—Michael J. Striker

(57) ABSTRACT

A method of establishing an initial telecommunication connection from a first telecommunications terminal to a second telecommunication terminal via a network unit of a telecommunications network, includes transmitting at least one message to the first telecommunications terminal while an initial telecommunications connections is being established by the network unit, reproducing the at least one message, when received by the first telecommunications terminal, at least one reproducing device of the first telecommunications terminal, storing the at least one message, after being received in the first telecommunications terminal, for one-time or repeated reproduction and the reproducing device.

10 Claims, 1 Drawing Sheet

METHOD FOR THE ESTABLISHMENT OF A TELECOMMUNICATION LINK

This application is a 371 of PCT/DE00/04612 Dec. 22, 2000.

BACKGROUND OF THE INVENTION

The invention is based on a method for establishing a telecommunications connection according to the general class of the main claim.

Methods for establishing a telecommunications connection from a first telecommunications terminal to a second telecommunications terminal are already known. The telecommunications connection is thereby realized by means of a telecommunications network via exchanges, whereby such an exchange is a network unit of the telecommunications network.

SUMMARY OF THE INVENTION

In contrast, the method according to the invention for establishing a telecommunications connection [having the features of the main claim] has the advantage that at least one message is transmitted to the first telecommunications terminal while the initial telecommunications connection is being established by the network unit, and that the at least one message, when received by the first telecommunications terminal, is reproduced at at least one reproducing device of the first telecommunications terminal. In this fashion, the connection set-up phase can be use—independently of the set-up of the first telecommunications connection—to have information sent to a user of the first telecommunications terminal by the telecommunications network, e.g., by a telecommunications carrier. As a result, the waiting time until the first telecommunications connection is fully established can be bridged for the calling subscriber, i.e., the user of the first telecommunications terminal. A telecommunications carrier obtains the advantage of generating new sources of income by transmitting advertising messages to the first telecommunications terminal during set-up of the first telecommunications connection. The telecommunications carrier could thereby lease, to any company, the time required to establish the initial telecommunications connection and time beyond this as advertising time.

Of particular advantage is the fact that the transmission of at least one message and its reproduction at the first telecommunications terminal is terminated, at the latest, as soon as the set-up of the initial telecommunications connection is completed. In this fashion, the time required to establish the initial telecommunications connection can be used in optimal fashion to transmit information from the network unit to the first telecommunications terminal and to reproduce the information at the first telecommunications terminal.

An optimal utilization of the time available for establishing the initial telecommunications connection to transmit and reproduce information also results when transmission of the at least one message and its reproduction at the first telecommunications terminal is terminated, at the latest, as soon as it is determined after a specified time that the initial telecommunications connection does not yet exist.

A further advantage lies in the fact that a connection set-up request is transmitted from the first telecommunications terminal to the telecommunications network to establish the initial telecommunications connection, that receipt of the connection set-up request in the telecommunications network of the network unit is responded to in that a second telecommunications connection is established between the network unit and the first telecommunications terminal, and that the at least one message is transmitted once or repeatedly via the second telecommunications connection from the network unit to the first telecommunications unit for reproduction at the reproducing device. In this fashion, connection resources are reserved in the form of the second telecommunications connection specifically for transmitting information from the network unit to the first telecommunications unit, via which said connection resources a plurality of different messages, in particular, can be transmitted from the network unit to the first telecommunications terminal during set-up of the initial telecommunications connection. Set-up of the second telecommunications connection from the network unit to the first telecommunications terminal does not require a special design of the first telecommunications terminal. Since the second telecommunications connection—like the initial telecommunications connection to be established—is a conventional telecommunications connection, and the two telecommunications connections do not exist simultaneously—because the second telecommunications connection is disconnected, at the latest, as soon as the initial telecommunications connection is fully established, no changes to the first telecommunications terminal are required as compared to a conventional telecommunications terminal in order to make it possible to receive and reproduce at least one message. No special abilities are required of the first telecommunications terminal, therefore, for it to receive and reproduce the at least one message from the network unit.

A further advantage lies in the fact that a connection set-up request is transmitted from the first telecommunications terminal to the telecommunications network to establish the initial telecommunications connection, that receipt of the connection set-up request in the telecommunications network is confirmed by the network unit by the transmission of an acknowledgement message to the first telecommunications terminal, and that the at least one message is transmitted with the acknowledgement message from the network unit to the first telecommunications terminal. In this fashion, it is not necessary to establish a second telecommunications connection and, therefore, allocate additional connection resources in order to transit the at least one message from the network unit to the first telecommunications terminal. An allocation of connection resources does not take place until the initial telecommunications connection has been fully established. Transmission of the at least one message from the network unit to the first telecommunications terminal is therefore particularly economical and cost-effective.

A further advantage lies in the fact that an acknoweldgement ready-to-receive message is transmitted with the connection set-up request at the earliest from the first telecommunications terminal to the telecommunications network, with which the first telecommunications terminal notifies the telecommunications network that it supports the receipt of the acknowledgement message with the at least one message during set-up of the first telecommunications connection. In this fashion, the situation can be prevented in which the network unit transmits the acknowledgement message with the at least one message to a first telecommunications terminal that is incapable of receiving or detecting and reproducing, if applicable, the acknowledgement message with the at least one message. An unnecessary dispatching of the acknowledgement message with the at least one message from the network unit to the first telecommunications terminal is therefore prevented.

A further advantage lies in the fact that the at least one message, as the acknowledgement message, is transmitted from the network unit to the first telecommunications terminal. In this fashion, transmission of a specific acknowledgement message independently of the at least one message can be eliminated. Receipt of the at least one message at the first telecommunications terminal is then interpreted as an appropriate acknowledgement of the connection set-up request received in the telecommunications network.

BRIEF DESCRIPTION OF THE DRAWINGS

Exemplary embodiments of the invention are shown in the drawing and explained in greater detail in the subsequent description.

DESCRIPTION OF THE PREFERRED EMBODIMENTS

Figure 1:
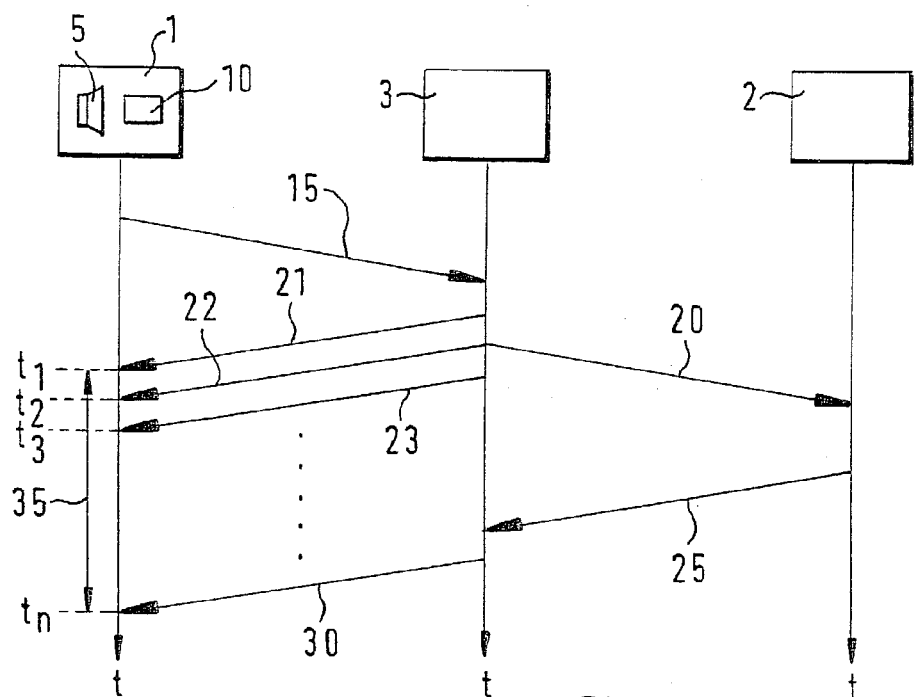
FIG. 1 shows a view of a first exemplary embodiment for a chronological sequence of the method according to the invention.

In FIG. 1, reference numeral 1 identifies a first telecommunications terminal, which can be designed wire-bound, cordless, or wireless in nature. When designed as a wire-bound telecommunications terminal, the first telecommunications terminal 1 can be realized according to the ISDN (Integrated Services Data Network) standard, for example. When designed as a cordless telephone, the telecommunications terminal 1 can be realized according to the DECT (Digital European Cordless Telecommunications) standard, for example. When designed as a wireless telecommunications terminal, the first telecommunications terminal 1 can be realized as a mobile telephone, in particular according to the GSM (Global System for Mobile Communications) standard, or according to the UMTS (Universal Mobile Telecommunications System) standard. The same applies for a second telecommunications terminal 2, which can also be designed as a wire-bound, cordless, or wireless telecommunications terminal. The first telecommunications terminal 1 comprises, according to FIG. 1, an acoustic reproducing device 5 in the form of a loudspeaker, and an optical reproducing device 10 in the form of a display. It can thereby be provided as well that only the acoustic reproducing device 5 or only the optical reproducing device 10 is provided at the first telecommunications terminal 1. The first telecommunications terminal 1 and the second telecommunications terminal 2 are thereby designed as conventional telecommunications terminals and comprise, in particular, a controller in each case for enabling information exchange in order to establish a telecommunications connection. The controller of the first telecommunications terminal 1 and the controller of the second telecommunications terminal 2 are not shown in FIG. 1, however, to ensure transparency. An initial telecommunications connection between the first telecommunications terminal 1 and the second telecommunications terminal 2 will now be established via a telecommunications network, whereby the initial telecommunications connection is to be established starting at the first telecommunications terminal 1. The connection set-up thereby takes place by means of a network unit 3 of the telecommunications network. The chronological sequence of the set-up of the initial telecommunications connection from the first telecommunications terminal 1 to the second telecommunications terminal 2 will be described hereinbelow. Initially, a connection set-up request 15 is transmitted from the first telecommunications terminal 1 to the network unit 3 in order to request the initial telecommunications connection between the first telecommunications terminal 1 and the second telecommunications terminal 2. The network unit 3 receives the connection set-up request 15 and initially establishes a second telecommunications connection between the first telecommunications unit 1 and the network unit 3. The network unit 3 transmits an initial message 21 to the first telecommunications terminal 1 via this second telecommunications connection, which said first telecommunications terminal receives the initial message 21 at an initial instant $t_1$ and then reproduces it acoustically at the acoustic reproducing device 5 and/or optically at the optical reproducing device 10. If the second telecommunications connection is a telephone communication, the first messge 21 is transmitted as a telephone message from the network unit 3 to the first telecommunications terminal and reproduced acoustically at the acoustic reproducing device 5. If the second telecommunications connection is a data connection, the first message 21 is transmitted as a data message from the network unit 3 to the first telecommunications terminal 1 and reproduced optically at the optical reproducing device 10. The network unit 3 then transmits a second message 22 to the first telecommunications terminal 1, which is received by the first telecommunications terminal 1 at a second instant $t_2$ and reproduced optically and/or acoustically in the manner described. The network unit 3 then transmits a third message 23 to the first telecommunications terminal 1, which is received and reproduced there optically and/or acoustically in the manner described at a third instant $t_3$. Further messages can then be transmitted in the manner described from the network unit 3 to the first telecommunications terminal 1 and reproduced there in the manner described. The messages 21, 22, 23, . . . transmitted from the network unit 3 to the first telecommunications terminal 1 can be information of the most diverse nature, e.g., charge information from a telecommunications carrier of the telecommunications network, advertising messages, operating instructions from the telecommunications carrier, or the like. Once the connection set-up request 15 is received, the network unit 3 also transmits a connection set-up message 20 to the second telecommunications terminal 2 to establish the initial telecommunications connection. The second telecommunications terminal 2 acknowledges receipt of the connection set-up message 20 by transmitting a connection set-up confirmation 25 to the network unit 3. The network unit 3 then transmits a response 30 to the first telecommunications terminal 1 in order to disconnect the connection set-up for the initial telecommunications connection. The response 30 is received at the first telecommunications terminal 1 at an $n^{th}$ instant $t_n$, so that, from this point forward, the first telecommunications connection between the first telecommunications terminal 1 and the second telecommunications terminal 2 is fully established via the telecommunications network. The connection set-up request 15 is also referred to as "Call Setup Request". The connection set-up message 20 is also referred to as "Setup". The connection set-up confirmation 25 is also referred to as "Call Confirmed/Connect". The response 30 is also referred to as "Answer".

The second telecommunications connection is established when the first message 21 is received at the first telecommunications terminal 1 at the first instant $t_1$ and exists until the $n^{th}$ instant $t_n$. When the initial telecommunications connection is fully established, the second telecommunications connection is disconnected, so that the two telecommunications connections do not overlap in terms of time. The duration of the second telecommunications connection is thereby indicated in FIG. 1 with reference numeral 35. The second telecommunications connection is unusual in that connection resources, e.g., in the form of a telephone communication or a data connection between the first telecommunications terminal 1 and the network unit 3, are reserved in the telecommunications network between the first telecommunications terminal 1 and the network unit 3 for the duration of the second telecommunications connection.

If the network unit 3 does not receive the connection set-up confirmation 25 from the second telecommunications terminal 2 within a specified time of, e.g., 2 minutes from the instant the connection set-up request 15 is received, it aborts the set-up of the initial telecommunications connection. Additionally, the network unit 3 notifies the first telecommunications terminal 1—by means of an acoustic signal in the case of a telephone communication or by means of a data signal in the case of a data connection—via the second telecommunications connection that set-up of the first telecommunications connection has been aborted. The acoustic signal is thereby reproduced at the acoustic reproducing device 5, and the data signal is reproduced at the optical reproducing device 10. The message transmitted from the network unit 3 to the first telecommunications terminal 1 about the aborting of the set-up of the initial telecommunications connection can also take place independently of the second telecommunications connection. The network unit 3 then terminates the existing second telecommunications connection and transmission of messages to the first telecommunications terminal 1. The messages 21, 22, 23, . . . can be messages that differ from each other. Two or more or all messages can also be identical, however.

The second telecommunications connection can also be aborted by the network unit 3 before the initial telecommunications connection is fully established. Likewise, the second telecommunications connection 35 can be aborted by the network unit 3 even before the specified time from receipt of the connection setup request 15 expires.

Figure 2:
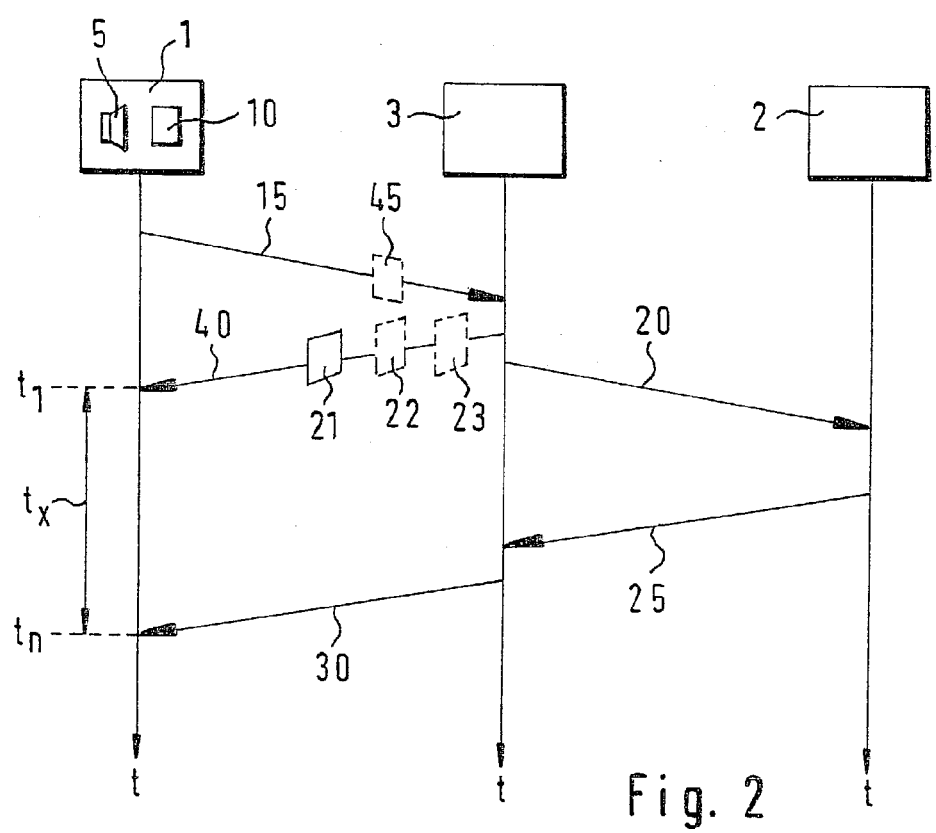
FIG. 2 shows a view of a second exemplary embodiment for a chronological sequence of the method according to the invention.

A second exemplary embodiment of the method according to the method is also shown in FIG. 2, whereby the same reference numerals are used to identify the same elements in FIG. 2 as in FIG. 1. FIG. 2 also depicts a chronological sequence of the set-up of the initial telecommunications connection from the first telecommunications terminal 1 via the network unit 3 to the second telecommunications terminal 2. Set-up of the initial telecommunications connection from the first telecommunications terminal 1 to the second telecommunications terminal 2 via the network unit 3 thereby takes place by means of the message exchange—described hereinabove for the first exemplary embodiment according to FIG. 1—of the connection set-up request 15, the connection set-up message 20, the connection set-up confirmation 25, and the response 30.

The only difference from the first exemplary embodiment according to FIG. 1 lies in the fact that the network unit 3—after receiving the connection set-up request 15—does not establish a second telecommunications connection between the first telecommunications terminal 1 and the network unit 3. Instead, it only transmits an acknowledgement message 40 about receipt of the connection set-up request 15 to the first telecommunications terminal 1. The network unit 3 transmits—with the acknowledgement message 40—the first message 21 to the first telecommunications terminal 1. The acknowledgement message 40 with the first message 21 is received by the first telecommunications terminal 1 at the first instant $t_1$. Between the first instant $t_1$ and the $n^{th}$ instant $t_n$, a time interval $t_x$ results in which the first message 21 is reproduced once or repeatedly at the telecommunications terminal 1. If the first message 21 is transmitted as a telephone signal with the acknowledgement message 40 to the first telecommunications terminal 1, an acoustic reproduction takes place at the acoustic reproducing device 5 of the first telecommunications terminal 1. If the first message 21 is transmitted as a data signal with the acknowledgement message 40 to the first telecommunications terminal 1, an optical reproduction takes place at the optical reproducing device 10 of the first telecommunications terminal 1. A permanent, i.e., for the interval $t_x$, allocation of connection resources or the set-up of a second telecommunications connection between the first telecommunications terminal 1 and the network unit 3 is not required for the acknowledgement message 40 to be transmitted with the first message 21.

The interval $t_x$ represents the time in which the first message 21 is reproduced once or repeatedly at the acoustic reproducing device 5 and/or at the optical reproducing device 10 of the first telecommunications terminal 1. It can thereby be provided that the first telecommunications terminal 1 comprises a timing circuit that is activated at the first instant $t_1$. While this timing circuit is activated, a one-time or repeated reproduction of the first message 21 takes place at the first telecommunications terminal 1. The timing circuit expires after a specified time, after which the reproduction of the first message 21 at the first telecommunications terminal 1 is aborted. Reproduction of the first message 21 at the first telecommunications terminal 1 is terminated, however, at the latest and independently of a longer duration of the timing circuit, when the response 30 is received at the first telecommunications terminal 1 at the $n^{th}$ instant $t_n$, or a message is received by the network unit 3 stating that set-up of the initial telecommunications connection was aborted. If the timing circuit expires before receipt of the response 30 or a message from the network unit 3 about the unsuccessful set-up of the initial telecommunications connection, reproduction of the first message 21 is also terminated when the timing circuit expires.

It can further be provided that the first telecommunications terminal 1 transfers an acknowledgement ready-to-receive message 45 with the connection set-up request 15 to the network unit 3, with which the first telecommunications terminal 1 notifies the telecommunications network or the telecommunications unit or the network unit 3 that it supports the receipt of the acknowledgement message 40 with at least one message during set-up of the initial telecommunications connection. The acknowledgement message 40 with the corresponding messge is then transmitted from the network unit 3 to the first telecommunications terminal only when the network unit 3 first receives the acknowledgement ready-to-receive message 45. If the network unit 3 does not receive such an acknowledgement ready-to-receive message 45, it either sends no acknowledgement message 40 and no message to the first telecommunications terminal 1, so that such a message cannot be reproduced at a first telecommunications terminal 1, or—according to the first exemplary embodiment—it establishes the second telecommunications connection to transmit one or more messages to the first telecommunications terminal 1 if it does not receive or detect such an acknowledgement ready-to-receive message 45 within a specified time after receipt of the connection set-up request 15.

It can also be provided that one or more further messages 22, 23 are also transmitted from the network unit 3 to the first telecommunications terminal 1 with the aid of the acknowledgement message 40, as indicated by the dashed representation in FIG. 2.

The acknowledgement ready-to-receive message 45 transmitted, if necessary, with the connection set-up request 15 only indicates that the first telecommunications terminal 1 supports the receipt of the acknowledgement message 40 with at least one such message during set-up of the initial telecommunications connection.

It can further be provided that the at least one message 21, 22, 23, as the acknowledgement message 40, is transmitted from the network unit 3 to the first telecommunications terminal 1, i.e. the acknowledgement message 40 is composed exclusively of one or more such messages. Since such a message is transmitted from the network unit 3 to the first telecommunications terminal 1 only when the network unit 3 has received the connection set-up request 15, the transmission of such a message can itself be used as an acknowledgement message.

The acknowledgement ready-to-receive message 45 is also referred to as a "Call Establishment Request". The acknowledgement message 40 is also referred to as "Call Establishment Confirm".

In the case of the second exemplary embodiment according to FIG. 2, connection resources are not allocated until the $n^{th}$ instant $t_n$, when the initial telecommunications connection is fully established.

What is claimed is:

1. A method of establishing an initial telecommunication connection from a first telecommunications terminal to a second telecommunication terminal via a network unit of a telecommunications network, the method comprising the steps of transmitting at least one message to the first telecommunications terminal while an initial telecommunications connections is being established by the network unit reproducing the at least one message, when received by the first telecommunications terminal, at least one reproducing device of the first telecommunications terminal; storing the at least one message, after being received in the first telecommunications terminal, for one-time or repeated reproduction at the reproducing device.

2. A method as defined in claim 1; and further comprising terminating the transmission of the at least one message and its reproduction at the first telecommunication terminal, at the-latest as soon as set-up of the initial telecommunication connection is completed.

3. A method as defined in claim 1; and further comprising terminating the transmission of the at least one message and its reproduction at the first telecommunication terminal, at the latest as soon as it is determined after a specific time that the initial telecommunications connection does not yet exist.

4. A method as defined in claim 1; and further comprising transmitting a transmission set-up request from the first telecommunications terminal to the telecommunications network to establish the initial telecommunications connection; responding receipt of the connection set-up request in the telecommunications network by the network unit, in that a second telecommunications connection is established between the network unit and the first telecommunications terminal; and transmitting the at least one message once or repeatedly via the second telecommunications connection from the network unit to the first telecommunications terminal for reproduction at the reproducing device.

5. A method as defined in claim 4; and further comprising terminating the second telecommunications connection at the latest as soon as the initial telecommunications connection is established.

6. A method as defined in claim 1; and further comprising transmitting a connection set-up request from the first telecommunications terminal to the telecommunications network to establish the initial telecommunications connection; confirming receipt of the connection set-up request in the telecommunications network by the network unit by transmission of an acknowledgment message to the first telecommunications terminal; and transmitting the at least one message with the acknowledgment message from the network unit to the first telecommunications terminal.

7. A method as defined in claim 6; and further comprising transmitting an acknowledged ready-to-receive message with the connection set-up request at the earliest from the first telecommunications terminal to the telecommunications network with which the first telecommunications network notifies the telecommunications network that it supports the receipt of the acknowledgment message with the at least one message during setup of the initial telecommunications connection.

8. A method as defined in claim 7; and further comprising transmitting the at least one message from the network unit to the first telecommunications terminal only if the network unit first receives the acknowledgment ready-to-receive message.

9. A method as defined in claim 6; and further comprising transmitting the at least one message as the acknowledgment message from, the network unit to the first telecommunications terminal.

10. A method as defined in claim 7; and further comprising, if the network unit does not receive an acknowledgment ready-to-receive message from the first telecommunications terminal within a specified time after receipt of the connection set-up request, responding receipt of the connection set-up request by the network unit in that a second telecommunications connection is established between the network unit and the first telecommunications terminal; and transmitting at least one message once or repeatedly via the second telecommunications connection from the network unit to the first telecommunications terminal for reproduction at the reproducing device.

* * * * *